US008677819B2

(12) United States Patent
Austerlitz et al.

(10) Patent No.: US 8,677,819 B2
(45) Date of Patent: Mar. 25, 2014

(54) IN-LINE FUEL PROPERTIES MEASUREMENT UNIT

(75) Inventors: Howard Austerlitz, Stony Brook, NY (US); Ron Bueter, Cary, NC (US); Alexander Nektaredes, Stony Brook, NY (US); Ron King, Medford, NY (US); Mark Savino, West Sayville, NY (US); Stanley Wood, Middle Island, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 273 days.

(21) Appl. No.: 13/088,931

(22) Filed: Apr. 18, 2011

(65) Prior Publication Data
US 2012/0260731 A1 Oct. 18, 2012

(51) Int. Cl.
*G01F 23/26* (2006.01)
*G01N 9/00* (2006.01)
(52) U.S. Cl.
USPC ........................................ 73/304 C; 73/32 R
(58) Field of Classification Search
USPC .......... 73/295, 304 C, 863.11, 32 R; 424/9.1; 604/21, 117, 116, 181; 607/116, 119, 607/122; 606/32
See application file for complete search history.

(56) References Cited

U.S. PATENT DOCUMENTS

| | | | | |
|---|---|---|---|---|
| 2,982,895 A * | 5/1961 | Exon | ................ | 361/284 |
| 3,599,489 A * | 8/1971 | Marshall, Jr. | ............... | 73/861.09 |
| 3,748,551 A * | 7/1973 | Petersen | ................ | 361/284 |
| 4,513,624 A * | 4/1985 | McHale et al. | ............ | 73/861.12 |
| 4,568,874 A * | 2/1986 | Kramer et al. | ................ | 324/688 |
| 4,631,969 A * | 12/1986 | Schmoock | ................ | 73/861.12 |
| 4,965,731 A * | 10/1990 | Weitz, Jr. | ................ | 701/123 |
| 5,062,305 A * | 11/1991 | Hansen et al. | ............ | 73/861.12 |
| 5,544,532 A * | 8/1996 | Brown | ................ | 73/861.16 |
| 5,596,150 A * | 1/1997 | Arndt et al. | ................ | 73/861.12 |
| 5,626,785 A * | 5/1997 | Rajnik et al. | ................ | 219/541 |
| 6,177,763 B1 * | 1/2001 | Morrow | ................ | 313/607 |
| 6,803,775 B2 * | 10/2004 | Sanchez et al. | ............ | 324/698 |
| 6,951,549 B1 * | 10/2005 | Beyerlein | ................ | 604/117 |
| 8,120,370 B2 * | 2/2012 | Harada et al. | ................ | 324/658 |
| 2008/0047721 A1 * | 2/2008 | Chen et al. | ................ | 173/15 |
| 2008/0072685 A1 * | 3/2008 | Chuang | ................ | 73/861.08 |
| 2008/0099619 A1 * | 5/2008 | Diaks | ................ | 244/135 R |
| 2010/0011877 A1 * | 1/2010 | Izumi et al. | ................ | 73/861.12 |
| 2010/0251816 A1 * | 10/2010 | Bahorich et al. | ................ | 73/304 |

FOREIGN PATENT DOCUMENTS

DE 38 04 674 A1 8/1989
EP 2 330 393 A1 6/2011

OTHER PUBLICATIONS

International Search Report for corresponding European Application No. 12 16 4248 dated Sep. 13, 2012.

* cited by examiner

*Primary Examiner* — Hezron E Williams
*Assistant Examiner* — David Z Huang
(74) *Attorney, Agent, or Firm* — Renner, Otto, Boisselle & Sklar, LLP

(57) ABSTRACT

An in-line fuel properties measurement unit (IFPMU) (50) for in-line assembly in a fluid flow path, in particular a fuel flow path of an aircraft, includes a compensator section (58) and a densitometer section (60). The densitometer section is connected in-line with the compensator section such that full fluid flow is seen by each section. The IFPMU further includes a circuit card having tabs or "arms" for electrically interfacing with cylinders of the compensator section, wherein the cylinders include reliefs formed therein to create an air gap between the cylinder and the tab.

20 Claims, 7 Drawing Sheets

IN-LINE FUEL PROPERTIES MEASUREMENT UNIT

FIELD OF THE INVENTION

The present invention relates generally to fluid gauging and, more particularly, to a fuel gauging device, method and system for determining properties of fuel provided to a vehicle, such as an aircraft.

BACKGROUND

Accurate fuel gauging in an aircraft plays an important part in the economic operation of the aircraft. If the quantity of fuel on an aircraft can be measured accurately and reliably it enables the minimum amount of fuel to be carried without any risk of danger. In a modern aircraft the weight of fuel can account for half the total weight of the aircraft. By reducing the amount of fuel carried, more passengers or freight can be carried. Alternatively, it can enable the aircraft to have a longer range and reduce the need for refueling stops.

Measurement of the quantity of fuel within an aircraft's fuel-tanks is commonly performed by means of one or more capacitive probes arranged for immersion in fuel in the tank. The capacitance of the probe varies in accordance with the depth of fuel in the tank, thereby enabling an indication of fuel level to be obtained. Changes in permittivity of fuel which would affect the capacitance of the probe can be compensated for by use of a permittivity cell (which may be in the form of a parallel-plate capacitor of open construction) mounted at the bottom of the fuel-tank, so as always to be immersed in any fuel present. An indication of volume may be obtained directly if the tank is of a regular shape, that is, if the volume of fuel present varies in a linear fashion with the depth of fuel. For irregularly shaped tanks the probe may be suitably-shaped such that the surface area of the plates covered by fuel varies in a non-linear fashion with depth but in a manner that is directly related to the volume of fuel present. Alternatively, the output of the probe may be supplied to a computer in which is stored a model of the fuel-tank from which can be obtained an indication of the volume with knowledge of the fuel depth.

In many applications, such as, for example, in aircraft, it is necessary to have an indication of the fuel mass rather than its volume. The mass of fuel can be readily determined by measuring its density with some form of densitometer. Most modern aircraft are equipped with several fuel-tanks and, because of the variations in density between different fuels, such as might be supplied to different tanks during refueling stops at different airports, it is necessary to obtain a measure of the density of each of the fuel mixtures within the different tanks.

Conventional fuel gauging devices typically reside in the aircraft fuel tank as shown in FIG. 1A. More particularly, a conventional aircraft fuel system 10 may include a fuel fill pipe 12 coupled to a fuel tank 14 so as to enable fuel to be delivered to the fuel tank. Mounted to a bottom portion of the fuel tank 14 is a conventional gauging device 16, wherein the gauging device 16 includes a feed pipe 18a for sampling fuel stored in the tank 14 and a discharge pipe 18b for providing the sampled fuel back to the tank. With further reference to FIG. 1B, the conventional fuel gauging device 16 comprises a compensator 20 and a densitometer 22 arranged on a mounting plate 24. The mounting plate 24 is configured for attachment inside a fuel tank 14, such as a lower portion of the fuel tank. The compensator 20 receives a fraction of the fuel delivered to the fuel tank via feed pipe 18a, which is coupled to an input port 20a of the compensator 20. A portion of the fuel delivered to the input port 20a passes through the compensator to output port 20b, which returns the fuel to the fuel tank 14 via discharge pipe 18b. The remaining portion of the fuel is provided to a second output port 20c for delivery to the densitometer 22 as described below. Both the compensator and the densitometer experience relatively low fluid flow rates and are sensitive to the accumulation of gas bubbles that such low flow rates encourage.

The compensator 20 includes a temperature probe 26 for measuring a temperature of the fuel passing through the compensator 20, and a capacitive measurement circuit (not shown) for determining a permittivity of the fuel. The permittivity as determined from the capacitive measurement circuit is corrected based on the measured temperature of the fuel, and a signal corresponding to the measurement is provided at signal terminals 28. Preferably, the compensator is factory-calibrated to be within a known capacitance range.

Moving to the densitometer 22, an input port 22a of the densitometer 22 is coupled to the output port 20c of the compensator 20 via a densitometer feed pipe 30, and an output port (not shown in FIG. 1) of the densitometer 22 returns the fuel to the fuel tank 14. The densitometer 22 includes measurement circuitry (not shown) for measuring the density of the fuel, and a temperature probe 32 for correcting the measured density. A signal corresponding to the fuel density is provided at signal terminals 34. The densitometer also contains a small circuit card containing resistors that represent its calibration data (within a limited tolerance).

SUMMARY OF INVENTION

Conventional fuel gauging devices only measure a fraction of the fuel delivered to the tank and, thus, there are uncertainties regarding the accuracy of the fuel properties measurement, which leads to uncertainties with respect the mass of the fuel delivered to the fuel tank. Further, conventional fuel gauging devices are large, heavy and expensive assemblies. Since there may be multiple fuel gauging devices on a single vehicle, the weight and cost can be significant, which is undesirable in a vehicle such as an aircraft. Also, since the fuel seen by the compensator is not the same fuel seen by the densitometer, the temperature of the fuel monitored by the respective devices may be different. This necessitates two separate temperature probes (one at the compensator and one at the densitometer) to ensure the respective devices receive accurate data with respect to fuel temperature. In addition, the low flow rates these devices work with makes them more prone to problems caused by the accumulation of gas bubbles.

A fuel gauging device in accordance with the present invention is configured for in-line placement with the vehicle's fuel filling system. In this manner, the fuel gauging device sees all fuel delivered to the vehicle, instead of just a fraction of the fuel as in conventional fuel gauging devices. This enables highly accurate measurements of the fuel properties and, thus, of the mass of the fuel delivered to the fuel tank. Further, the fuel gauging device in accordance with the invention includes a compensator arranged in series with a densitometer. Thus, the compensator and densitometer see the same fuel and, therefore, only a single temperature probe is needed for the fuel gauging device.

According to one aspect of the invention, an in-line fuel properties measurement unit (IFPMU) for in-line assembly in a fluid flow path, in particular a fuel flow path of an aircraft (55), includes a compensator section, and a densitometer section connected in-line with the compensator section such that full fluid flow is seen by each section.

The compensator section can include a first flow passage through which fluid can flow, wherein the compensator section is configured to measure a permittivity of fluid passing through the first flow passage. Further, the densitometer section comprises a second flow passage through which fluid can flow, wherein the densitometer section is configured to measure a density of fluid passing through the second flow passage. Additionally, the first and second flow passages are arranged in-line with each other such that fluid flowing through one of the first flow passage or the second flow passage also flows through the other of the first flow passage or the second flow passage. Alternately, the fluid flow direction can be reversed and the densitometer section can be the flow inlet.

The first flow passage can include an outer member having a flow passage formed therein, an inner member arranged within the outer member, and an intermediate member arranged between the outer member and the inner member, the intermediate member having a flow passage formed therein. The inner member also may include a flow passage formed therein. Further, the outer member and the inner member can be electrically connected to one another.

The IFPMU can further include circuitry configured to store at least one of information that uniquely identifies the IFPMU or calibration information for the compensator section and/or densitometer section. The circuitry can be formed on a circuit board, and the circuit board can be arranged between the compensator section and the densitometer section. The circuit board can include an opening formed therein to correspond with the first and second flow passages. The circuit board can further include at least one first tab electrically coupled to both the outer member and the inner member, and at least one second tab electrically connected to the intermediate member. This circuit board also provides a high-pressure, fluid-tight seal between the compensator and densitometer sections, via the use of o-rings, for example.

The densitometer section can include a sensor element arranged within the second flow passage, the sensor element configured to obtain data corresponding to a density of the fluid passing through the second flow passage. Further, the densitometer section or the compensator section should include a temperature probe arranged in the flow path of the one of the respective sections. Precise temperature measurements ensure accurate calculation of fluid properties.

According to another aspect of the invention, a vehicle fuel storage system includes at least one storage tank, and the IFPMU as described herein, wherein the IFPMU is in-line with fuel provided to the storage tank. The vehicle fuel storage system can further include a fuel pipe for providing fuel to the storage tank, wherein the IFPMU is arranged in-line with the fuel pipe. Further, the IFPMU can be arranged at least partially in at least one storage tank.

The vehicle fuel storage system may also include a fuel gauging system operatively coupled to the IFPMU. The gauging system can be configured to determine a mass of fuel delivered to the storage tank based on data obtained by the IFPMU.

According to another aspect of the invention, an in-line fuel properties measurement unit (IFPMU) for in-line assembly in a fluid flow path includes: a compensator section including an inner cylinder arranged within an outer cylinder, said compensator section configured to measure a permittivity of fluid passing between the inner and outer cylinders; and a first tab electrically coupled to the inner cylinder for communicating electrical data to or from the compensator section, wherein the outer cylinder includes a first relief for receiving the first tab, the first relief configured to provide an air gap between the first tab and the outer cylinder. The air gap may be formed by the relief, and/or may be arranged between the first tab and a closest proximal point on the outer cylinder relative to the first tab.

The inner cylinder may include a second relief for receiving the first tab, the second relief configured to provide an air gap between at least part of the first tab and the inner cylinder.

The IFPMU may further include a circuit card for transmitting and/or receiving the electrical data to/from the compensator section, wherein the first tab is formed integral with the circuit card. The circuit card may be arranged at a proximal end of the compensator section. The IFPMU may further include a support device arranged at a distal end of the compensator section opposite the proximal end, the support device including a second tab coupled to the inner cylinder, wherein the outer cylinder includes a second relief for receiving the second tab, the relief configured to provide an air gap between the first tab and the outer cylinder.

The circuit card may include circuitry configured to store at least one of information that uniquely identifies the IFPMU or calibration information for the compensator section and/or densitometer section. The circuit card may be arranged between the compensator section and the densitometer section and includes an opening formed therein to correspond with the first and second flow passages.

The compensator section may include only one electrical connection for each cylinder.

The IFPMU may further include a densitometer section connected in-line with the compensator section such that full fluid flow is seen by each section, the densitometer section configured to measure a density of fluid passing through the densitometer section.

The compensator section may include a first flow passage through which fluid can flow, and the densitometer section comprises a second flow passage through which fluid can flow, wherein the first and second flow passages are arranged in-line with each other such that fluid flowing through one of the first flow passage or the second flow passage also flows through the other of the first flow passage or the second flow passage.

The first flow passage may include the outer cylinder having a flow passage formed therein, the inner cylinder arranged within the outer cylinder, and an intermediate cylinder arranged between the outer cylinder and the inner cylinder, the intermediate member having a flow passage formed therein. Additionally, the inner cylinder may include a flow passage formed therein.

The outer cylinder and the inner cylinder may be electrically connected to one another. Additionally, the first flow passage and second flow passage may be formed as annular flow passages.

The densitometer section may include a sensing element arranged within the second flow passage, the sensing element configured to obtain data corresponding to a density of the fluid passing through the second flow passage.

The IFPMU may further include a temperature probe arranged in the flow path of the densitometer section or the compensator section.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The principles of the invention will now be described with reference to the drawings. Because the invention was conceived and developed for use in aircraft fuel systems, it will be herein described chiefly in this context. However, the principles of the invention in their broader aspects can be adapted to fuel systems in other types of vehicles.

Figure 1A:
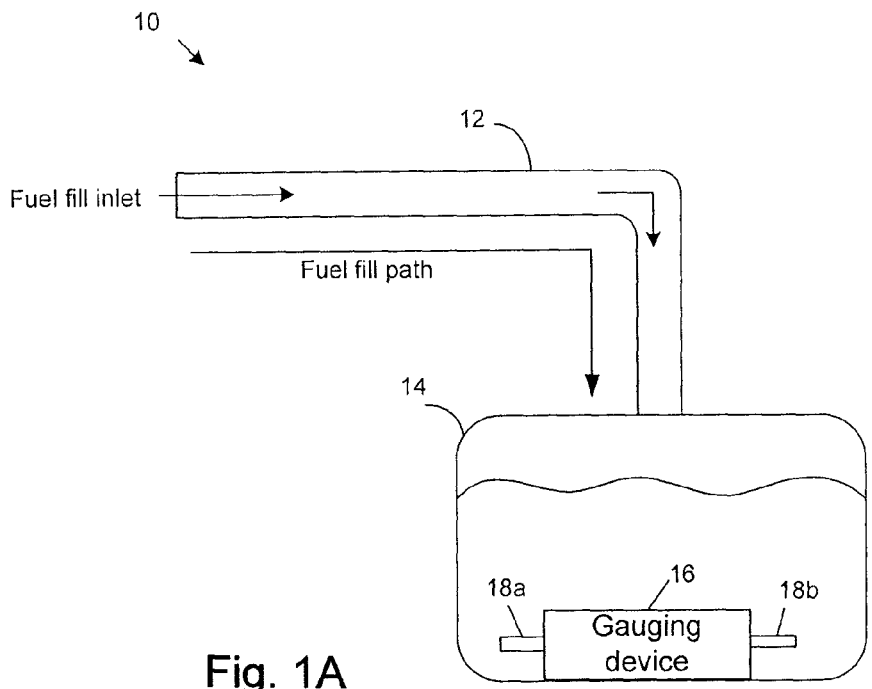
FIG. 1A is a schematic diagram illustrating a conventional aircraft fuel filling and storage system.
Figure 1B:
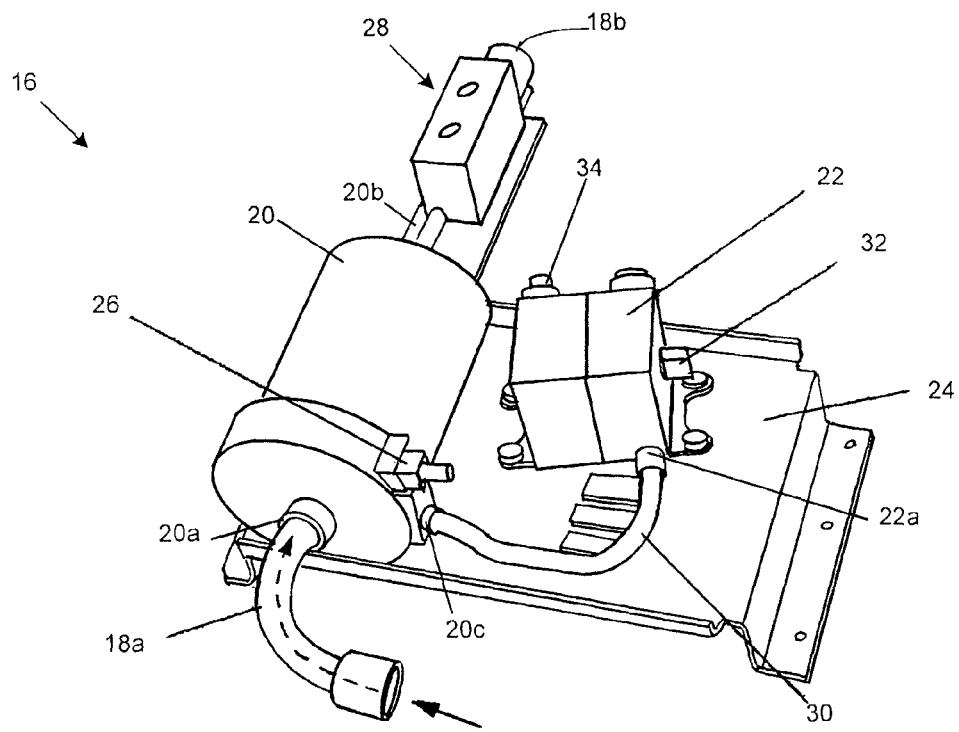
FIG. 1B illustrates a conventional fuel gauging device.
Figure 2:
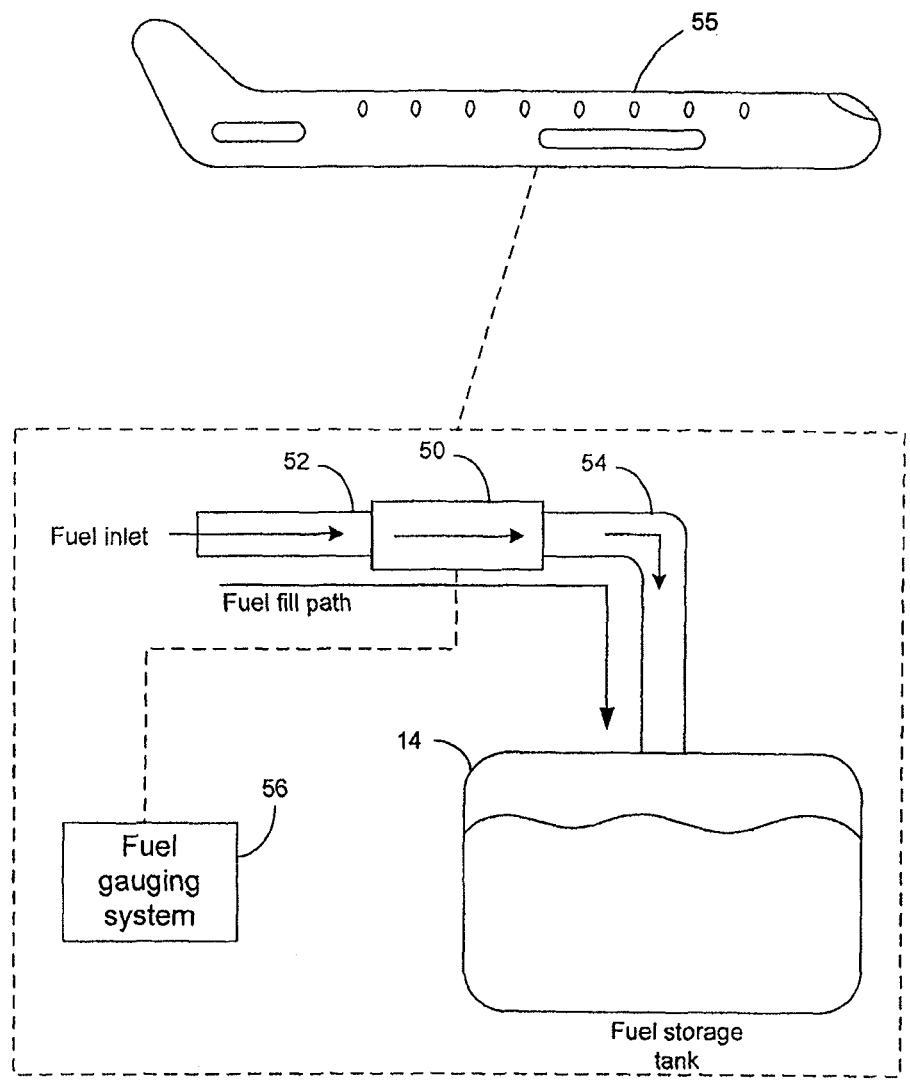
FIG. 2 is a schematic diagram of an exemplary aircraft fuel filling and storage system in accordance with the present invention.

An in-line fuel properties measurement unit (IFPMU) in accordance with the present invention is configured to measure the density, permittivity and temperature of fuel as the fuel is uploaded into the aircraft's fuel tank. With reference to FIG. 2, the IFPMU 50 may be configured in a pipe configuration to enable placement in-line (in series) with fuel filling pipes 52 and 54 of an aircraft 55, thereby exposing the IFPMU 50 to the full refueling pressure and flow rate. While the IFPMU 50 is shown external from the tank 14, it is noted that the IFPMU can be mounted to the tank 14 or even partially in the tank 14. Preferably, the IFPMU 50 is configured to present minimum resistance and disturbance to the fuel flow in the filling pipes 52 and 54. Data provided by the IFPMU 50 is provided to the aircraft's fuel gauging system 56 to calculate the mass and other properties of the fuel on the aircraft using conventional techniques.

Figure 3:
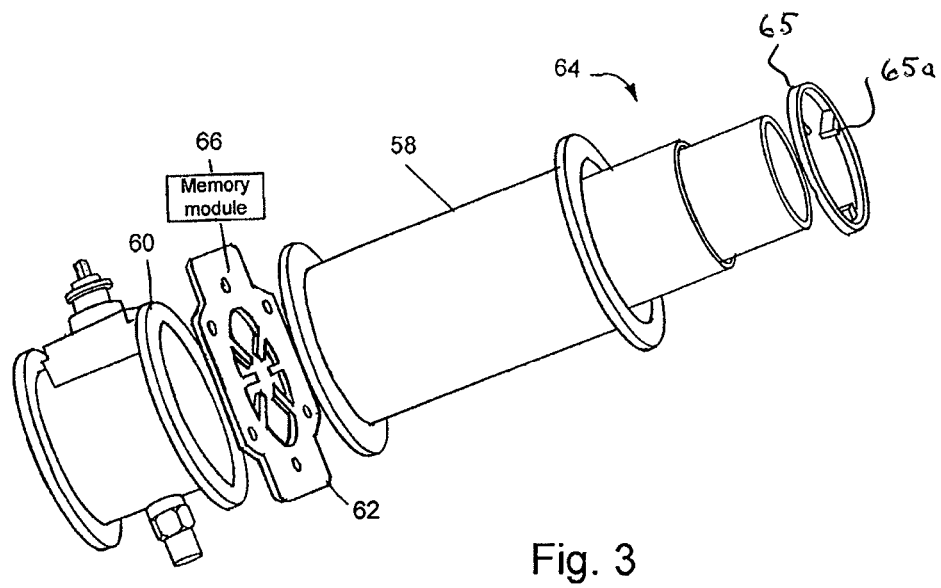
FIG. 3 illustrates an exploded view of an exemplary in-line fuel properties measurement unit in accordance with the present invention.
Figure 4:
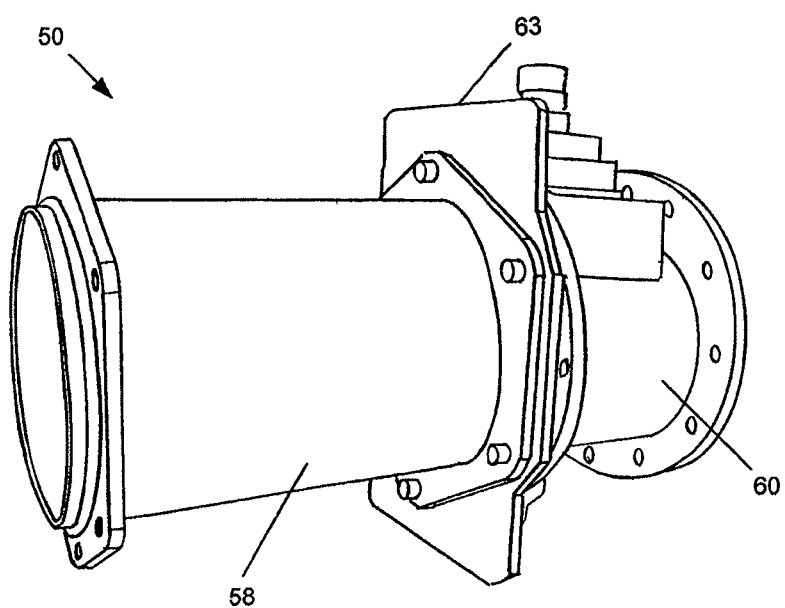
FIG. 4 illustrates an assembled in-line fuel properties measurement unit in accordance with the present invention.

With further reference to FIGS. 3 and 4, there are shown exploded and assembled views of an exemplary IFPMU 50 in accordance with the invention. The IFPMU 50 in accordance with the present invention is lighter than conventional fuel properties measurement units, and is exposed to the entire fuel flow, which allows the IFPMU 50 to measure fuel properties more accurately. Further, and as described in more detail below, the IFPMU can include detailed calibration information, making the IFPMU 50 much more accurate than conventional fuel properties measurement units.

The IFPMU 50 includes a compensator section 58 for measuring a permittivity of the fuel, and a densitometer section 60 for measuring a density and temperature of the fuel. Preferably, the compensator and densitometer sections are kept separate to simplify construction and calibration, although they may be formed as an integral unit. The compensator section 58 and the densitometer section 60 are optionally coupled to each other via an electronic circuit card 62 (e.g., a circular circuit card sandwiched between the compensator section and the densitometer section), which, as described in more detail below, makes electrical contact with metal cylinders 64 of the compensator section 58. The circuit card configuration eliminates the need for wires, which can break and present intrinsic safety electrical arcing hazards. A support device 65 is attached to the cylinders 64 at an end opposite the circuit card 62, the support device 65 including a support structure 65a (e.g., spokes or the like). The circuit card 62 and support device 65 couple to the cylinders 64 (e.g., via a solder connection) so as to maintain a concentric relationship between the respective cylinders 64.

Preferably, the IFPMU 50 includes identification information that uniquely identifies the particular IFPMU. This identification information, which may be a serial number or other identifier, preferably is a passive identifier that may be hard-coded on the IFPMU 50 using, for example, a plurality of resistors or jumpers, wherein each resistor/jumper represents at least part of a character or number of the identifier. As described below, the identification information may be used by the fuel gauging system 56 (or other system) to retrieve calibration information corresponding to the particular IFPMU 50.

The IFPMU 50 also may include an electronic memory module 66 for storing calibration information for the entire assembly. The calibration information can include calibration coefficients for both the densitometer and the compensator, wherein the coefficients correspond to different temperatures. The memory module may be formed as part of the circuit card 62, or it may be formed separate from the circuit card. The memory module 66, in addition to or instead of storing calibration information, may store information corresponding to the IFPMU identifier, such as a serial number or other identifier.

In calibrating the compensator section 58, values for dry capacitance $C_{dry}$ (Farads) and effective capacitance $C_{eff}$ (Farads) are established and stored in memory. As fuel passes through the compensator section 58, the capacitance value is measured $C_{meas}$ (Farads) and the dielectric constant K (Farads/meter) is calculated, for example, using equation 1.

$$(K-1) = \left(\frac{c_{meas} - c_{dry}}{c_{eff}}\right) \qquad \text{Eq. 1}$$

With respect to the densitometer section 60, during refuel the frequency of oscillation $f_o$ (Hz) of the densitometer section 60 is measured and, using equation 2, the frequency $f_d$ (Hz) is calculated ($f_d$ is used to compute density as described below), wherein $T_f$ (degrees F.) is the measured temperature of the fuel, and TEC (delta f/f/degree F.) is the thermoelastic coefficient for the densitometer section (e.g., between 1 E-06 and 15E-06 in integral steps).

$$f_d = f_o - (T_f - 10)*(TEC)*f_0 \qquad \text{Eq. 2}$$

The frequency $f_d$ along with coefficients $L_o$, $L_2$, and TEC (which can be stored in memory) are used in equation 3 to determine an initial density of the fuel. $L_o$ is an integer (e.g., about 3000), and L2 is a real number accurate to three decimal places. The initial density then is multiplied by the M factor to arrive at the calculated fuel density, where the M factor is a real number between 0 and 5 in steps of 0.1. The actual values for $L_0$, $L_2$, the M factor and TEC may be determined empirically during calibration of the densitometer.

To further improve the accuracy of the densitometer calculations, calibration data can include separate coefficients for different temperatures. The software performing the density calculation would use the coefficients that correspond to the currently measured fuel temperature.

$$D=L_o+L_2 \qquad \text{Eq. 3}$$

In the event the memory module 66 fails, the calibration information, in addition to being stored in the memory module 66, may be stored external to the IFPMU 50 and associated with the IFPMU's identifier. In this manner, failure of the memory module 66 does not render the IFPMU inoperative. For example, upon initial power up the fuel gauging system 56 may read the calibration data from the IFPMU memory module 66, and store the information in memory of the system 56 along with the identifier. Then, should the memory module 66 fail, the calibration information can be retrieved from the fuel gauging system's memory based on the identifier (the identifier can be a passive identifier that is independent of the memory module 66). Alternatively, the calibration data can be loaded via other means, such as a memory stick or RFID tag.

Figure 5A:
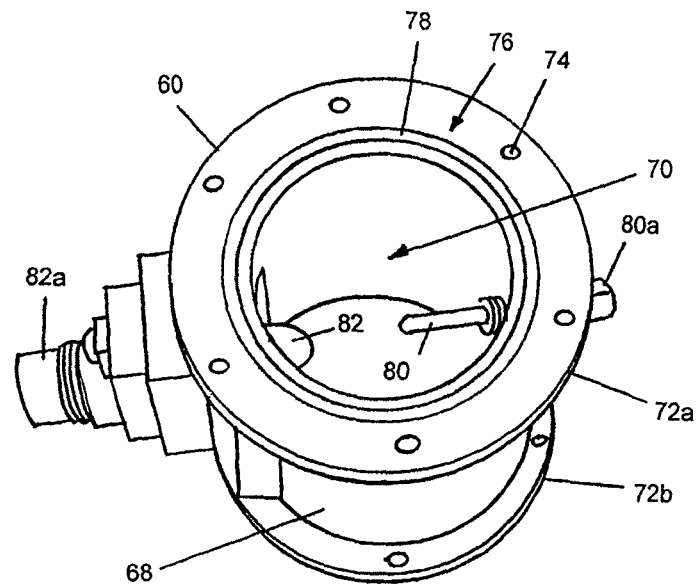
FIG. 5A illustrates an exemplary densitometer section of the in-line fuel properties measurement unit in accordance with the present invention.

Referring now to FIG. 5A, an exemplary densitometer section 60 in accordance with the present invention is shown. The exemplary densitometer section is formed having an annular tube section 68, thereby defining a flow passage 70 through which fluid may flow. Although the densitometer section is shown having an annular shape, other shapes are possible depending of the specific requirements of the application. Flanges 72a and 72b are formed on respective ends of the densitometer section 60 for coupling to another device (e.g., the compensator section 58, fuel delivery pipes 52 or 54, and/or tank 14). Each flange 72a and 72b includes a plurality of bores 74 for receiving fasteners (not shown) to couple the densitometer section 60 to the compensator section 58, fuel delivery pipes 52 or 54 and/or tank 14. Additionally, the face of each flange 72a and 72b may include a groove or recess 76 for receiving a sealing member 78, such as an O-ring, for example. Arranged within the flow passage 70 is a temperature sensor 80, such as an RTD temperature sensor, and a density sensing element 82.

The temperature sensor 80 obtains data corresponding to temperature of fluid flowing through the flow passage 70 using known techniques. Electrical connector 80a provides a means for communicating the temperature data collected by the temperature sensor to the gauging system 56. It is noted that while the temperature sensor 80 is shown as part of the densitometer section 60, the temperature sensor may alternatively be placed in the compensator section 58, or both the densitometer section 60 and the compensator section 58 may include a temperature sensor. The temperature sensor could also be mounted directly on the circuit card, or even embedded into the circuit card, so that it has no exposed conductors (for intrinsic safety considerations).

Figures 5B, 5C:
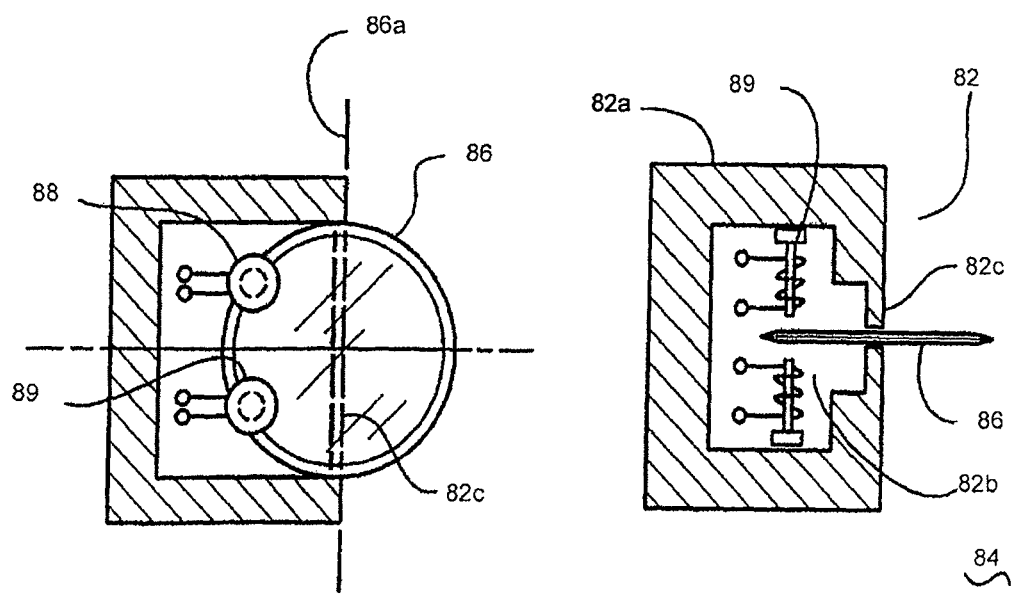
FIG. 5B is a cross sectional view of a fluid density sensing element that can be used in the densitometer section of FIG. 5A.
FIG. 5C is a top view of the disk shaped member driving coils and pickup coils of the sensing element of FIG. 5B.

With additional reference to FIGS. 5B and 5C, the sensing element 82 has a body 82a with an internal chamber 82b. A wall 82c separates chamber 82b from the fluid which surrounds the sensing element which is generally indicated 84. A disk shaped member 86 extends through the wall 82c and is fixably mounted therein. As shown in FIG. 5C, wall 82C is a straight wall and is coaxial with a first axis 86a through a center of disk shaped member 86. Wall 82c is thinned in the area where member 86 passes therethrough as shown in FIG. 5B.

Disk shaped member 86 is a relatively thin flat disk of unitary construction, and preferably tapered about its periphery to a pointed edge. The disk can be approximately 1.25 inches in diameter and may be made of Ni-Span-C nickel iron alloy, which is a magnetic material. Other materials and dimensional relationships may also be used.

A pair of driving coils 88 (only one of which is shown in FIG. 5C) are mounted inside chamber 82b. Preferably, driving coils are mounted in opposed fashion such that there is one on each side of member 86, although it is possible that both driving coils are on one side of the disk and both pick up coils may be on the other side of the disk, or only one driving coil may be used, or other combinations may be used. The driving coils are positioned adjacent an outer periphery of member 86. The driving coils are conventional electromagnetic coils which are comprised of a magnet and pole piece, and a coil as schematically shown in FIG. 5B. As is shown more clearly in FIG. 5C, driving coils 88 are positioned approximately 45 degrees from axis 86a, and are used to impart motion to member 86 at a first location on the disk adjacent the driving coils.

A pair of pickup coils 89 is also mounted inside chamber 82b of the sensing element 82. Pickup coils 89 can be conventional electromagnetic coils similar to driving coils 88. The pickup coils are positioned adjacent a second location on the disk 86 which is approximately 90 degrees from the position of the driving coils. The pick up coils are used to measure the displacement of member 86 at the second location.

The driving and pickup coils are electrically connected to phase lock loop (PLL) circuitry (not shown) that is designed to vibrate the disk at a resonant frequency (the PLL may be formed on the circuit card 62). The density of the fluid to be measured creates a mass loading effect on the external part of the disk 86, which changes the disk's resonant frequency in a manner that is correlated to the density of the fluid, and data corresponding to the density of the fluid is communicated to the gauging system 56 via electrical connector 82a. From the resonant frequency of the disk 86, the density of the fluid can be calculated based on established physical relationships. Further details regarding the vibrating disk and methods of calculating density can be found in U.S. Pat. No. 5,345,811, which is hereby incorporated by reference in its entirety.

Figure 6:
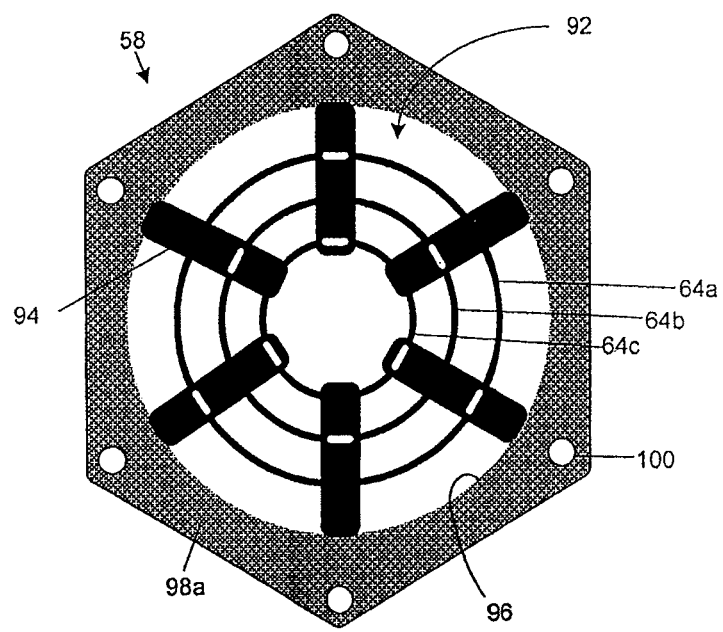
FIG. 6 illustrates an end view of exemplary compensator section of the in-line fuel properties measurement unit in accordance with the present invention.
Figure 7:
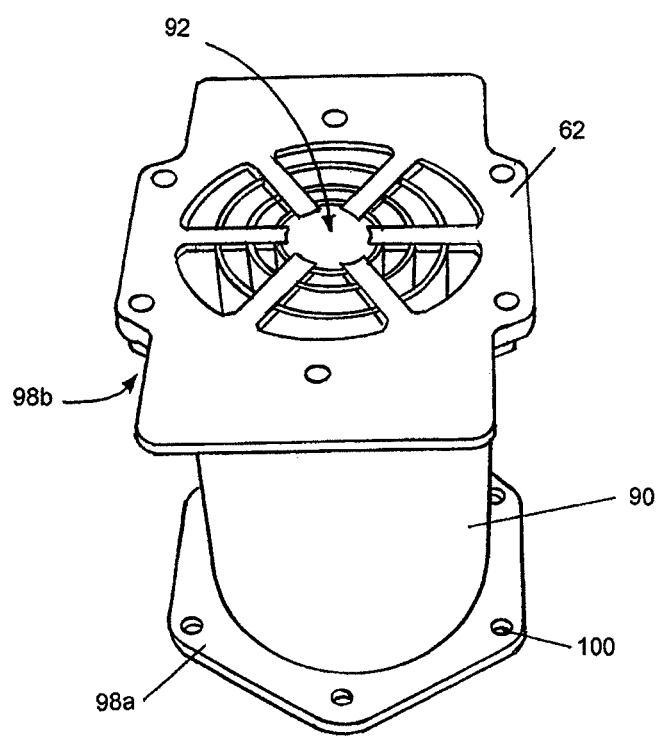
FIG. 7 illustrates a perspective view of the compensator section of FIG. 6.
Figure 8:
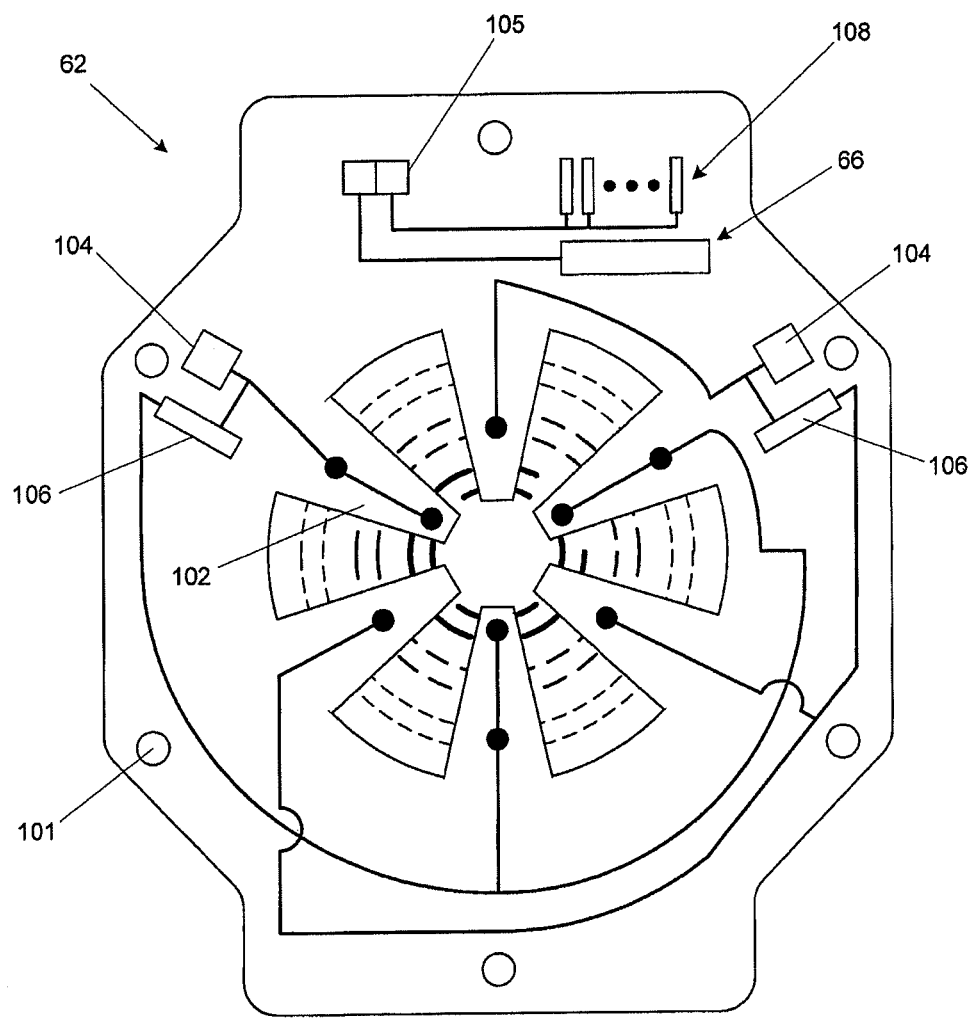
FIG. 8 illustrates an exemplary circuit card of the in-line fuel properties measurement unit in accordance with the present invention.

Moving now to FIGS. 6 and 7, end and perspective views, respectively, of an exemplary compensator section 58 in accordance with the present invention are shown (FIG. 7 also shows the circuit card 62, which is described in more detail with respect to FIG. 8). The exemplary compensator section 58 is formed having an annular tube section 90 that defines a flow passage 92 through which fluid may flow. As noted above, the annular shape is merely exemplary, and other shapes may be utilized without departing from the scope of the invention. Preferably, the shape of the compensator flow passage 92 corresponds to the shape of the densitometer flow passage 70 so as to minimize fluid disturbance and/or flow resistance.

Arranged within the flow passage 92 are cylinders 64a, 64b and 64c, which are formed from a conductive material, such as aluminum, for example, and held in place via a circular-shaped circuit card 93 that functions as a mechanical support for the cylinders. Tabs of the circuit card, which may be in the form of "spokes" and are described in more detail below with respect to FIG. 8, are attached to the end of the cylinders 64a, 64b and 64c, preferably via a solder connection. Flanges 98a and 98*b* are formed on respective ends of the tube section 90 and configured for coupling the compensator section to another device (e.g., the densitometer section 60, fuel delivery pipes 52 or 54 and/or tank 14). Each flange 98*a* and 98*b* includes a plurality of bores 100 for receiving fasteners (not shown) to couple the compensator section 58 to the densitometer section 60, fuel delivery pipes 52 or 54, and/or tank 14.

As described in more detail below, the outer and inner cylinders 64*a* and 64*c* are electrically coupled to one another, while the intermediate cylinder 64*b* is electrically isolated from the outer and inner cylinders 64*a* and 64*c*. The outer and intermediate cylinders 64*a* and 64*b* form a first capacitor, and the intermediate and inner cylinders 64*b* and 64*c* form a second capacitor, wherein the dielectric material of each capacitor is the fuel flowing through the flow passage 92. The capacitance of the two capacitors is measured to determine a permittivity of the fuel passing through the compensator section 58 using known techniques. The multi-cylinder approach implemented in the compensator section 58 increases the total capacitance of the compensator section, which minimizes errors due to stray capacitances. Further, the multi-cylinder design of the compensator section 58 minimizes flow resistance and disturbance during the fuel filling process and keeps the compensator section as short as possible (which also decreases the weight of the IFPMU, since it shortens the outer pipe length).

Referring now to FIG. 8, there is shown an exemplary circuit card 62 in accordance with the present invention, wherein the circuit card 62 is shown coupled to cylinders 64*a*, 64*b* and 64*c*. Due to the mounting of the circuit card 62 between the densitometer section 60 and the compensator section 58, the circuit card 62 is subjected to full fuel pressure and fuel flow during filling operations (e.g., up to 100 PSI and 1000 gallons per minute). Thus, the circuit card 62 can comprise a structural element of the IFPMU 50 and, therefore, is configured to withstand such pressure and flow. The circuit card 62 is made of a material that is resistant to hydrocarbon fuels, and preferably formed from a circuit board that is at least 0.175 inch thick. A plurality of bores 101 are formed in the circuit card 62 and correspond to bores 74 and 100 of the densitometer section 60 and compensator section 58.

The circuit card 62 includes a plurality of tabs 102 for electrically coupling the cylinders 64*a*, 64*b* and 64*c* of the compensator section 58 to the circuit card 62. Preferably, a solder connection is used to connect the tabs 102 to the cylinders 64*a*, 64*b* and 64*c*. Such arrangement of the tabs and end caps minimizes flow resistance and disturbance in the compensator section 58.

The tabs 102 are configured to electrically couple the outer and inner cylinders 64*a* and 64*c* to one another, while the intermediate cylinder 64*b* is electrically isolated from the outer and inner cylinders. For example, the tabs may include conductive traces that electrically couple the inner and outer cylinders 64*a* and 64*c* to one another as the tabs are soldered to the cylinders. Further, each tab 102 is electrically coupled to a connector terminal 104 (e.g., via a conductive trace), thereby providing a means for electrically connecting the cylinders 64*a*, 64*ba* and 64*c* to other equipment, such as the fuel gauging system 56. The circuit card 62 can also include bleed resistors 106 (e.g., a 10 Mega ohm resistor) electrically coupled between each cylinder and ground, wherein the bleed resistors function to discharge static build up on the cylinders 64*a*, 64*b* and 64*c*. The circuit board traces that electrically connect the cylinders to the connector terminals are buried on inner layers to provide a minimal insulation thickness in order to meet intrinsic safety requirements. In addition, these traces are placed so as to minimize the overlapping of electrical connections between the two electrodes in order to minimize the capacitance added by the board.

The circuit card 62 also can include an electronic memory module 66 for storing identification information, such as a serial number or the like, as well as calibration information. The calibration information can include, for example, correction factors, scaling factors, serial numbers, etc. as described herein. The memory module 66 can employ conventional techniques for storing data, including flash memory, RFID, etc. Additionally or alternatively, the identification information may be hard-coded on the circuit card 62 using, for example, a plurality of resistors or jumpers 108 to uniquely identify the IFPMU 50. In this manner, the identification information can be retrieved from the IFPMU even in the event the memory module 66 fails. The memory module 66 and/or hard-coded identifier means are electrically coupled to connector 105, which provides a means for retrieving calibration and identification information from the circuit card 62.

While the circuit card 62 is shown in the figures as a structural member of the IFPMU 50, such circuit card may be separate from the IFPMU and/or reside on the IFPMU as a non-structural member. For example, the circuit card may be mounted on an outer portion of the compensator section 58 and/or densitometer section 60 that is not exposed to fluid flow. The circuit card then can be coupled to components of the respective sections via conductors, such as wires for example. Alternatively, the circuit card 62 may be located remote from the IFPMU 50 (e.g., in an environmentally controlled area) and electrically coupled to the components of the respective sections via conductors.

As is typical with any electronic device having adjacent conductors, the effect of stray capacitance may allow signals to leak between otherwise isolated circuits. In the IFPMU 50, such stray capacitance typically varies with temperature, and can produce an error in the determination of Cdry and/or Ceff, thereby degrading the accuracy of the K−1 calculation. Therefore, in order to achieve maximum accuracy in the compensator measurements, it is preferable to minimize the effects of stray capacitance produced by traces within the circuit card as well as the effect of stray capacitance due to interaction between the circuit card and the metal cylinders.

One way in which the effect of stray capacitance can be minimized is to maintain a minimum separation distance between traces connected to the compensator section 58 (e.g., traces connected to terminals corresponding to the compensator section 58). Additionally, the effect of stray capacitance can be minimized by arranging the traces corresponding to the compensator section 58 such that the traces do not cross one another.

The interface between the compensator cylinders 64 (cylinders 64*a*, 64*b* and 64*c*) and the tabs 102 also can be a source for stray capacitance. For example, due to the connection between the tabs 102 and compensator cylinders 64, an electric field passes between one metal cylinder (e.g., one of cylinders 64*a*, 64*b* or 64*c*) that contacts the tab 102 and the soldered connection on the circuit card 62 to the other cylinder (e.g., another of cylinders 64*a*, 64*b* or 64*c*), resulting in a significant contribution to the stray capacitance (each circuit card tab 102 can contribute several tenths of a picofarad to the total stray capacitance). This stray capacitance is due to the dielectric constant of the circuit card material.

Figure 9A:
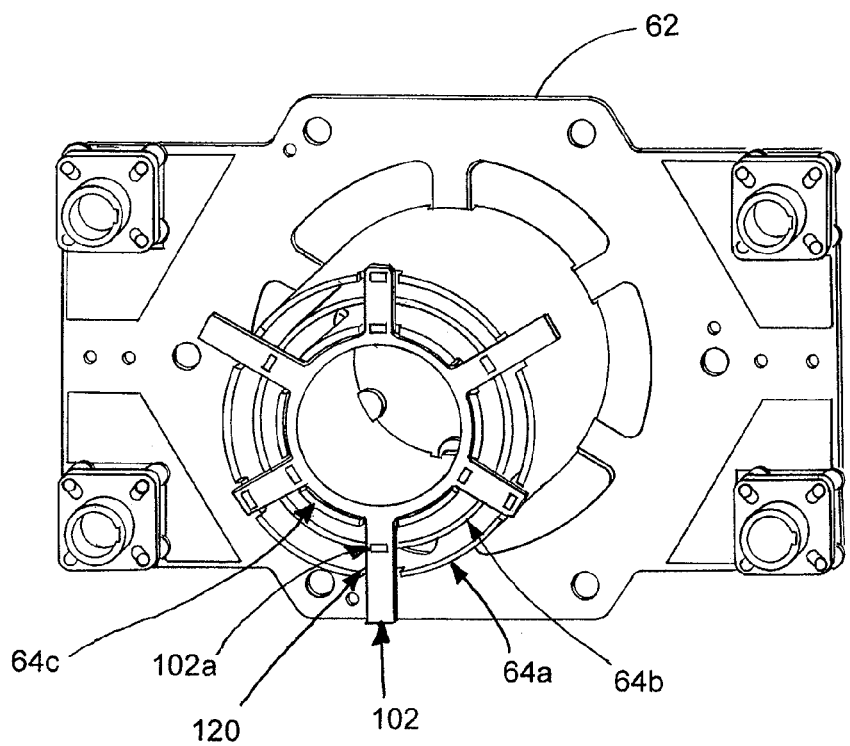
FIGS. 9A and 9B illustrate an exemplary relief formed in the compensator cylinders for minimizing the effect of stray capacitance in accordance with the present invention.
Figure 9B:
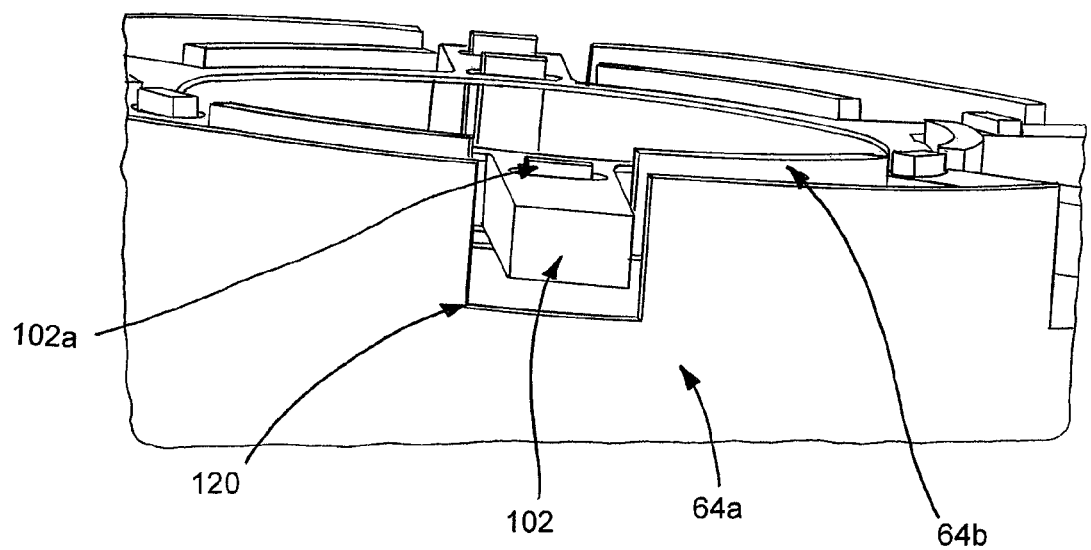

In accordance with the present invention, reliefs 120 are provided in the compensator cylinders 64*a*, 64*b* and 64*c* in areas adjacent to circuit card tabs 102 as shown in FIGS. 9A and 9B (e.g., in areas where the active terminal of the tab 102 is connected to each cylinder 64 and/or where the tabs span across a non-connected cylinder). In particular, the reliefs are arranged so as to provide an air gap between the tabs and a closest proximal point on the cylinder (e.g., the reliefs form or define the air gap).

The air gap formed by each relief 120 decreases the overall dielectric constant between the tab 102 and the cylinder 64 (and thus the effect of stray capacitance). Preferably, the reliefs 120 are formed so as to create 0.15 inch spacing between the tabs 102 and cylinders 64, although more or less spacing may be implemented depending on the specific application. The reliefs 120 (also referred to as notches or cutouts) are preferably implemented in regions where the main circuit card 62 and the support card 65 interface or otherwise would make physical contact with the cylinders 64.

In addition, the number of solder connections to the cylinders is preferably minimized to reduce stray capacitance. For example, and with reference to FIGS. 9A and 9B, the circuit card 62 includes six tabs 102, each tab 102 having an active connection 102a to at least one (and sometimes two) of the cylinders 64 (FIG. 9A, for example, illustrates nine active connections 102a). Since only one electrical connection is required to each cylinder, six of the active connections can be eliminated. Thus, to further minimize the effect of stray capacitance, only three active connections can be used.

By implementing the above techniques, several tenths of a picofarad per tab 102 can be eliminated from the system, thereby enhancing accuracy of the compensator section.

The IFPMU 50 in accordance with the present invention is lighter than existing fuel gauging devices, and is exposed to the entire fuel flow, thereby allowing it to more accurately measure the fuel properties. Further, it is simpler in design and, thus, is less expensive to manufacture and requires less labor to assemble. Also, the IFPMU 50 includes detailed calibration information for both the densitometer section 60 and compensator section 58, thereby making it much more accurate than conventional fuel gauging devices.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. An in-line fuel properties measurement unit (IFPMU) for in-line assembly in a fluid flow path, comprising:
    a compensator section including an inner cylinder arranged within an outer cylinder, said compensator section configured to measure a permittivity of fluid passing between the inner and outer cylinders; and
    a circuit card which is a structural member of the IFPMU and which includes a first tab electrically coupled to the inner cylinder for communicating electrical data to or from the compensator section, wherein the outer cylinder includes a first relief for receiving the first tab, the first relief configured to provide an air gap between the first tab and the outer cylinder.

2. The IFPMU according to claim 1, wherein the air gap is formed by the relief.

3. The IFPMU according to claim 1, wherein the air gap is arranged between the first tab and a closest proximal point on the outer cylinder relative to the first tab.

4. The IFPMU according to claim 1, wherein the inner cylinder comprises a second relief for receiving the first tab, the second relief configured to provide an air gap between at least part of the first tab and the inner cylinder.

5. The IFPMU according to claim 1, wherein the circuit card is arranged at a proximal end of the compensator section, further comprising a support device arranged at a distal end of the compensator section opposite the proximal end, the support device including a second tab coupled to the inner cylinder, wherein the outer cylinder includes a second relief for receiving the second tab, the relief configured to provide an air gap between the first tab and the outer cylinder.

6. The IFPMU according to claim 1, wherein the compensator section includes only one electrical connection for each cylinder.

7. The IFPMU according to claim 6, wherein the first flow passage and second flow passage are formed as annular flow passages.

8. The IFPMU according to claim 1, further comprising a densitometer section connected in-line with the compensator section such that full fluid flow is seen by each section, said densitometer section configured to measure a density of fluid passing through the densitometer section.

9. The IFPMU according to claim 8, the circuit card comprising circuitry configured to store at least one of information that uniquely identifies the IFPMU or calibration information for the compensator section and/or densitometer section.

10. The IFPMU according to claim 9, wherein said circuit card is arranged between the compensator section and the densitometer section and includes an opening formed therein to correspond with the first and second flow passages.

11. The IFPMU according to claim 8, wherein the compensator section comprises a first flow passage through which fluid can flow, and the densitometer section comprises a second flow passage through which fluid can flow,
    wherein the first and second flow passages are arranged in-line with each other such that fluid flowing through one of the first flow passage or the second flow passage also flows through the other of the first flow passage or the second flow passage.

12. The IFPMU according to claim 11, wherein the first flow passage comprises:
    the outer cylinder having a flow passage formed therein;
    the inner cylinder arranged within the outer cylinder; and
    an intermediate cylinder arranged between the outer cylinder and the inner cylinder, said intermediate member having a flow passage formed therein.

13. The IFPMU according to claim 12, wherein the inner cylinder comprises a flow passage formed therein.

14. The IFPMU according to claim 11, wherein the outer cylinder and the inner cylinder are electrically connected to one another.

15. The IFPMU according to claim 8, wherein the densitometer section comprises a sensing element arranged within the second flow passage, said sensing element configured to obtain data corresponding to a density of the fluid passing through the second flow passage.

16. The IFPMU according to claim 8, further comprising a temperature probe arranged in the flow path of the densitometer section or the compensator section.

17. A vehicle fuel storage system, comprising:
   at least one storage tank; and
   the IFPMU according to claim 1, wherein the IFPMU is arranged in-line with fuel provided to the storage tank.

18. The vehicle fuel storage system according to claim 17, further comprising a fuel pipe for providing fuel to the storage tank, wherein the IFPMU is arranged in-line with the fuel pipe.

19. The vehicle fuel storage system according to claim 17, wherein the IFPMU is arranged at least partially in the at least one storage tank.

20. The vehicle fuel storage system according to claim 17, further comprising a fuel gauging system operatively coupled to the IFPMU and configured to determine a mass of fuel delivered to the at least one storage tank based on data obtained by the IFPMU.

\* \* \* \* \*